United States Patent
Baribeault et al.

[11] Patent Number: 6,132,310
[45] Date of Patent: Oct. 17, 2000

[54] INTEGRATED HEATING AND FRESH AIR SUPPLY DEVICE FOR USE WITH AN AIR DISTRIBUTION SYSTEM

[75] Inventors: Jean Baribeault, St-Mathieu-du Parc; Michel Dostie; Denis Parent, both of Trois-Rivieres Ouest, all of Canada

[73] Assignee: Hydro-Quebec, Montreal, Canada

[21] Appl. No.: 09/226,607

[22] Filed: Jan. 7, 1999

Related U.S. Application Data

[63] Continuation-in-part of application No. 09/001,149, Dec. 30, 1997.

[51] Int. Cl.$^7$ .................................................. F24F 13/04
[52] U.S. Cl. ......................... 454/261; 454/263; 454/287; 392/363
[58] Field of Search ................. 454/261, 263, 454/269, 289, 287; 392/363

[56] References Cited

U.S. PATENT DOCUMENTS

| | | | |
|---|---|---|---|
| 2,363,294 | 11/1944 | Carrier | 257/3 |
| 2,663,244 | 12/1953 | Macdowell | 454/252 |
| 3,804,156 | 4/1974 | McDonough | 165/27 |
| 4,168,797 | 9/1979 | Luke | 237/48 |
| 4,688,626 | 8/1987 | Tengesdal | 165/54 |
| 4,712,611 | 12/1987 | Witzel | 165/122 |
| 5,348,077 | 9/1994 | Hillman | 165/16 |
| 5,413,530 | 5/1995 | Montaz | 454/262 |
| 5,564,980 | 10/1996 | Becker | 454/252 |
| 5,693,705 | 12/1997 | Stotz | 165/22 |
| 5,787,717 | 8/1998 | Bang | 62/89 |

FOREIGN PATENT DOCUMENTS

| | | | |
|---|---|---|---|
| 553 798 | 1/1957 | Belgium . | |
| 1 263 052 | 11/1989 | Canada . | |
| 1 289 117 | 9/1991 | Canada . | |
| 000544029B | 9/1959 | France | 454/263 |
| 001326550A | 4/1963 | France | 454/263 |
| 1494090 | 3/1966 | France | 454/263 |
| 1494090 | 12/1967 | France . | |
| 40 02 560 | 8/1991 | Germany . | |
| 569 818 | 2/1978 | U.S.S.R. . | |
| 754790 | 8/1956 | United Kingdom | 454/269 |
| 1038144 | 8/1966 | United Kingdom . | |

OTHER PUBLICATIONS

Extract from: National Research Council, "National Building Code of Canada 1990", 10th Edition, Ottawa, Canada, 1990, pp. 316–318.

Extract from: National Research Council, "National Building Code of Canada 1995", 11th Edition, Ottawa, Canada, 1995, pp. 297–306.

Extract from: ASHRAE, "Ventilation for Acceptable indoor air quality", ASHRAE standard standard 62–1989, Atlanta, USA, 1989, pp. 7–15.

Extract from: CMHC, "Ventilation and air quality testing in electrically heated housing", Ottawa, Canada, 1994, pp. 13 and 23a.

*Primary Examiner*—Harold Joyce
*Assistant Examiner*—Derek S. Boles
*Attorney, Agent, or Firm*—Foley & Lardner

[57] ABSTRACT

A ventilation unit for use with a heating or cooling system that is decentralized and does not require large conduits is disclosed. The system includes at least one fresh air intake; a fan operatively connected to the at least one fresh air intake for drawing air from outside of a space into the fresh air intake; and at least one ventilation unit located in the room. The ventilation unit includes a conduit defining an air passage having a first and second opposite ends, a diffuser operatively connected to the fresh air intake for outputting fresh air near the second opposite end of the conduit and for drawing ambient air from the room through the first opposite end. The ventilation unit also includes a heating element located downstream from the first opposite end inside the conduit. The ambient air is entrained towards the heating element which heats the ambient air, and the heated air is ventilated into the room at the second opposite end of the conduit by the action of a chimney effect and the fresh air diffuser. The system provides for adequate ventilation through the use of small conduits due to the decentralized heating of the air.

8 Claims, 3 Drawing Sheets

INTEGRATED HEATING AND FRESH AIR SUPPLY DEVICE FOR USE WITH AN AIR DISTRIBUTION SYSTEM

This application is a continuation-in-part of application Ser. No. 09/001,149, filed Dec. 30, 1997.

FIELD OF THE INVENTION

The present invention relates to a ventilation unit providing fresh air and room temperature control for use as part of a decentralized heating and cooling system.

DESCRIPTION OF THE PRIOR ART

Different methods and apparatuses have been proposed in order to ventilate a space such as a room, a house or an office building. This is an important consideration since an inhabited space will contain numerous pollutants, emanating from the space itself, from the furniture, from the external environment, and from human activity (i.e. breathing is a source of carbon dioxide ($CO_2$), candles, etc.). By their nature, these pollutants are impossible to eliminate completely. This is why it is necessary to replace the ambient air with air in which pollutants are in smaller concentration.

The most basic system is simply natural ventilation, where fresh air is introduced into a space through openings in the shell of a building. Vitiated air is exited from this space through the same openings.

However, in geographical areas where the ambient temperature can vary considerably, or when the temperature is either too hot or too cold for relatively long periods of time, new design practices involving increased airtightness of buildings have been implemented and mechanical ventilation has been introduced to better control the fresh air supply.

Along with the ventilation systems, many heating systems have been used in buildings. For instance, central heating systems have been proposed, hereinafter referred to as <<pulsed air systems>>, where air is heated in a furnace and then distributed to the various areas of the space with large conduits. The disadvantage of these large conduits is mostly the loss of usable space due to the size of the conduits. It should be noted that similar systems have been proposed for central air conditioning, where the air is cooled rather than heated. These systems can further be complemented with central humidifiers, air filters, etc. These systems are, in a house, centrally controlled with a thermostat, but buildings which are subdivided in many rooms can be locally controlled only to a certain degree.

Another type of heating system is through the use of radiators wherein hot water is circulated in order to heat the air around the radiator. The water is centrally heated and dispatched to the radiators through conduits.

Similarly, electric radiators are also in use, where an electric heating element is located in a radiator and is supplied with electricity through wires. An electric radiator will usually take the form of a narrow, rectangular housing in which a resistance is housed. The temperature control is effected through thermostats which alternately open and close the electrical circuit feeding the resistance. The advantage with an electrical radiator is that control of the heat can be effected for each room in which a thermostat is present.

However, the disadvantage with these types of heating systems, i.e. both electrical and hot water, is that they do not include any ventilation and/or mixing air and the heat diffusion is only driven by free convection. Furthermore, since air is expelled at low speed, it has a tendency to hug the wall against which the diffuser is placed, so that air in the center of a room will not be heated adequately. This also results in loss of energy, since a portion of the heat heats the wall, which is usually in contact with the exterior.

It is also known to use a diffuser which functions similarly to the electric radiator. This diffuser includes a conduit having two opposite ends, and heating means located within the conduit at a lower opposite end. Ambient air is naturally drawn into the conduit, heated and then expelled at the other opposite end. Because of its speed, the air is pushed further off the wall, avoiding to overheat it. Experience shows that the use of such a diffuser results in reduction of energy consumption for heating. The problem with such a diffuser is that it does not introduce fresh air into the space being heated. Furthermore, even if warm air does not hug the wall, it is still warmer than ambient air and so has a tendency to go up quickly and does not reach the center of the room.

The concept of introducing fresh air into the space is quite important. As mentioned above, due to energy considerations, new homes and buildings have an increased airtightness. Therefore, fresh air will not naturally be introduced into the space. The latest studies have found that in spaces where fresh air is not introduced, pollution and contaminants can rise to dangerous levels. As an example, a recent study by the Canadian Mortgage and Housing Corporation showed that in a bedroom where the door and windows were closed and no fresh air was introduced, the $CO_2$ level could exceed the maximum concentration of 3500 ppm allowed by Health and Welfare Canada.

Accordingly, in the United States, norm ASHRAE 62-1989 requires a minimum level of natural or mechanical ventilation for residential buildings. In Canada, the National Building Code, in its 1990 version, requires a minimum of mechanical ventilation for all new residences. In its 1995 version, the National Building Code (NBC 95) goes even further and requires a fresh air input in almost all of the rooms of a residence. This is evidence of a tendency towards comfort and towards protecting the health of the inhabitants.

There has also been proposed the use of independent ventilation systems. In their most basic form, these systems extract air from a predetermined area in the residence into the outside, replace the extracted air with fresh air and return a mixture of extracted and fresh air into the residence. The purpose of "pre-heating" the air is to avoid condensation on the conduits, as well as to minimize any discomfort for people near the fresh air output. More complex systems evacuate the totality of the air and recuperate the heat therein with a heat exchanger. The fresh air, now slightly heated, is then directed to the fresh air outputs. Most of these systems do not meet the NBC 95 since the distribution network does not reach into all of the rooms. These systems also represent an added component to a residence which does not interact with the heating system. These systems are also difficult to install in existing residences and the fresh air is usually much colder than the ambient air, thereby creating discomfort for the people in the residence.

Known in the art is Canadian Patent no. 1,263,052 which describes a method of ventilating a room, where one or several jets of fresh air at high velocity are blown into an induction chamber and draw surrounding air into the chamber. In the induction chamber, the fresh air and the surrounding air are mixed. The resulting mixture is introduced substantially horizontally into the room to be ventilated. One particular characteristic of this method is that the surrounding air that is drawn into the induction chamber is taken from a higher level in the room than the level at which the air mixture is introduced into the room.

Also known in the art is U.S. Pat. No. 2,663,244 to MACDOWELL which discloses a register outlet for warm air house-heating systems. This outlet however does not include heating means for each outlet, the heat being provided by the large feeder conduits and centrally heated.

U.S. Pat. No. 4,712,611 to WITZEL describes a heating or air-conditioning ventilation unit for motor vehicles. This patent teaches the use of a ventilator to feed air to heating means. However, this patent is not concerned with optimizing the distribution of heat in a room. Furthermore, this patent is directed specifically to motor vehicles, and considerations for heating a residence are quite different from the considerations in heating a car.

U.S. Pat. No. 5,564,980 to BECKER proposes a system for circulating air within a room but without using air recirculation. Fresh air is introduced in the room through a distribution network which brings the air to a ceiling ventilator. The system may also integrate heating or air-conditioning means, located in the fresh air conduit. However, this system does not address the complete heating requirements of a room, and the system needs to be supplemented with an independent heater.

SUMMARY OF THE INVENTION

It is an object of the invention to provide a heating and ventilation system that is decentralized, satisfies air quality requirements and does not require large conduits.

In accordance with the invention, this object is achieved with a ventilation unit located in a space to be ventilated and heated. The ventilation unit includes a conduit defining an air passage having a first and second opposite ends, the first opposite end lying proximate a floor, the second opposite end extending in a direction opposite the first end, heating means located within the conduit near the first opposite end, a fresh air diffuser located behind the conduit and having an outlet proximate the second end. The ventilation unit draws ambient air through the first opposite end due to a chimney effect created by the conduit, due to the heating means which heat the ambient air and force the heated ambient air to rise and due to the fresh air diffuser which propels the heated air out of the conduit at the second end and into the space and entrains the ambient air through the conduit. The way the heated and the fresh air are propelled into the room improve the distribution of heat therein. This improvement results in more energy savings and in increased comfort.

The ventilation unit can be part of a complete ventilation system. In addition, because the ventilation system does not have to carry all the warm air needed for heating but only fresh air for air quality, air conduits of small dimensions are sufficient to carry the amount of air needed, about 5 to 10 liters per second for each room. This feature makes the system easier to install in new constructions and makes retrofit easier in existing houses. Furthermore, since each of the ventilation units includes heating means, the heating provided by each of these ventilation units may be individually controlled to provide the desired degree of comfort in any given room. The controls could be wall mounted or integrated in the ventilation unit. The proposed system thus combines the advantages of a pulsed air system for heat diffusion without the need for large conduits, the advantage of bringing fresh air in each heating space and the advantage of the individual and selective control of each unit such as with electric baseboard heaters.

BRIEF DESCRIPTION OF THE DRAWINGS

The present invention and its advantages will be more easily understood after reading the following non-restrictive description of preferred embodiments thereof, made with reference to the following drawings, in which.

DESCRIPTION OF A PREFERRED EMBODIMENT OF THE INVENTION

Figure 1:
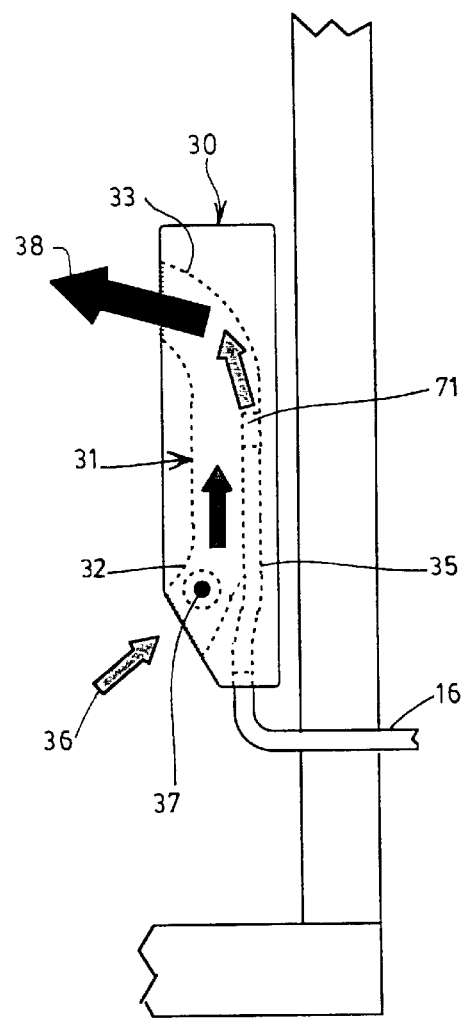
FIG. 1 is a cross-sectional view of a ventilation unit for use with the invention.
Figure 2:
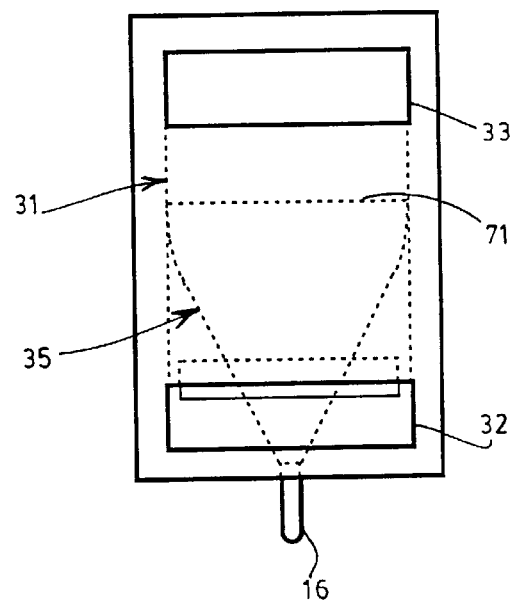
FIG. 2 is a front plan view of the ventilation unit of FIG. 1.

The present invention is concerned with an integrated heating and fresh air supply device for use with a decentralized air distribution system. The device will be hereinafter referred to as a "ventilation unit". A ventilation unit 30, shown in more detail in FIGS. 1 and 2 is located in a room 3 in a space such as a house or an office building, although there may be more than one per room 3, and includes a conduit 31 defining an air passage which has a first 32 and second 33 opposite ends. The ventilation unit 30 also includes a fresh air diffuser 35, operatively connected to a fresh air intake 20 through small diameter conduits 16, for outputting fresh air into the conduit 31. The diffuser 35 is preferably located near the second opposite end 33 of the conduit, as better shown on FIG. 2. The diffuser 3 5, by diffusing fresh air into the conduit 31, also draws ambient air from the room 3 into the conduit 31, as shown by arrow 36.

The ventilation unit 30 further includes heating means 37, such as a common electric heating element, located inside the conduit 31 near the first opposite end 32. Accordingly, the ambient air is pulled towards the heating means 37 through convection and through a chimney effect created by the conduit 31 and the heating means 37 (the heating means create a buoyancy force, which pulls the air upwardly). The heated air is further pulled towards the second opposite end 33 of the conduit 31 by the fresh air diffuser 35, which entrains the heated air out of the conduit 31 and into the room. The advantage of placing the diffuser 35 at this point is that the mixed fresh and heated air is projected further into the room as opposed to following the wall vertically, since the colder fresh air will prevent the heated air from rising too quickly. This results in better heat distribution in the room and less energy wasted through heating the wall, which can often be an outside wall.

Furthermore, the placing of the fresh air diffuser at this point results in a more efficient heat exchange at the location of the heating means 37, since the ambient air travels faster over the heating means.

Figure 3:
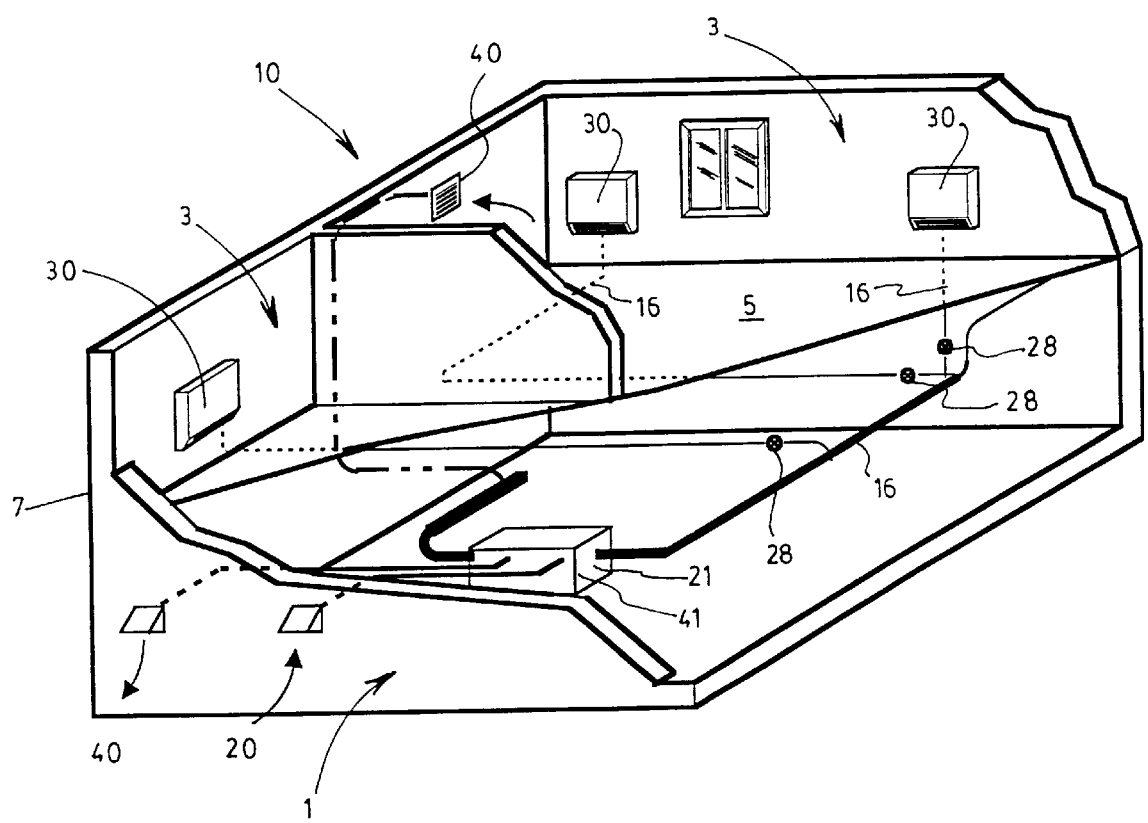
FIG. 3 is a schematic representation of a ventilation system according to a preferred embodiment of the invention, for use in a house.

Referring now to FIG. 3, the ventilation unit 30 according to the invention is particularly suited for use with a complete ventilation system 10. The system 10 is designed to ventilate a space 1 which has at least one room 3 and where the space 1 has an inside 5 and an outside 7.

The system 10 basically comprises at least one fresh air intake 20, means 21 operatively connected to the at least one fresh air intake 20 for drawing air from outside 7 the space 1 into the at least one fresh air intake 20, such as a fan, and at least one ventilation unit 30.

As can be seen on FIG. 3, the system 10 illustrated therein includes three ventilation units 30 in two separate rooms 3. It should be noted that the system may include valves 28 which can be used to regulate the amount of fresh air fed to the various units 30.

The system is further complemented by at least one evacuation air conduit 40, also located in the room 3, for evacuating vitiated air from inside 5 the room into the outside 7. Preferably, if the space 1 is divided into a plurality of rooms 3, each room 3 includes at least one evacuation air conduit 40. The evacuation air conduit 40, although able to function due to natural ventilation, is preferably connected to means 41 for drawing vitiated air from the room into the outside, such as a fan.

Figure 4:
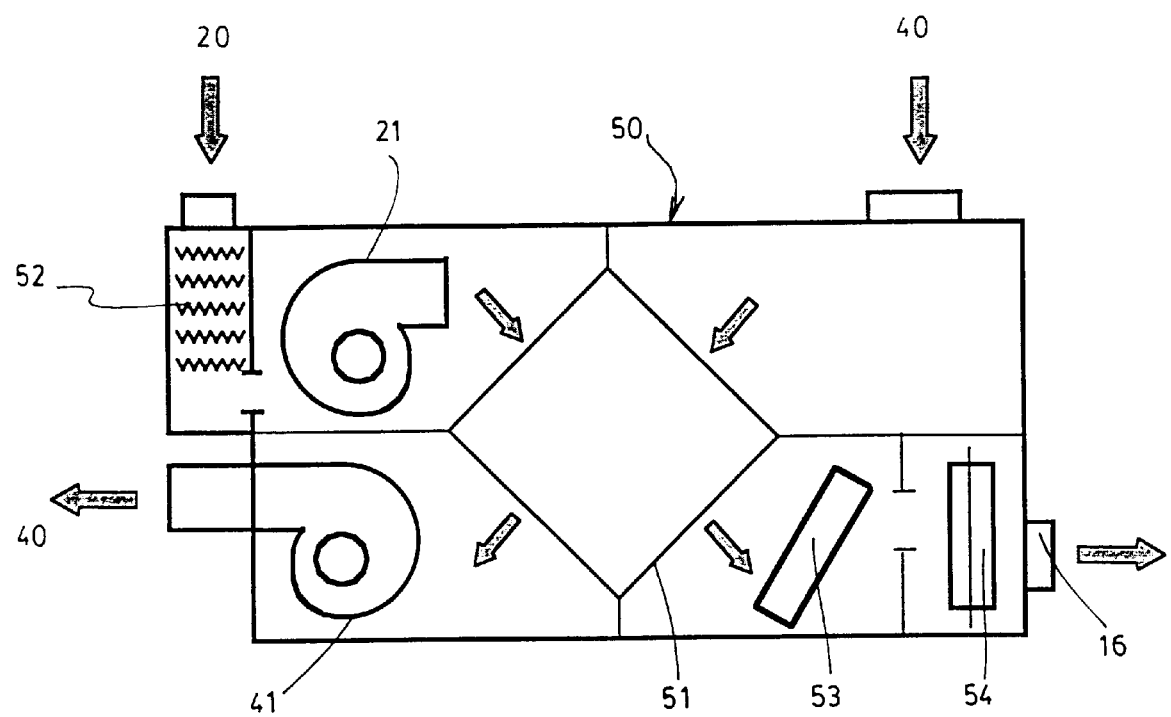
FIG. 4 is a schematic representation of a central unit.

Preferably, the fans 21, 41 for drawing air from the outside 7 and for drawing air from the inside 5 are enclosed in a single, central unit 50, as shown on FIG. 4, where the unit 50 also includes an energy recuperation device 51, which is well known in the art. This allows for the possibility of pre-heating the fresh air with heat recuperated from inside air, prior to dispatching the fresh air to the various ventilation units 30. This reduces the heating load imposed on the heating means 37 and provides for more constant heat in the room 3. It should also be understood that the energy recuperation device may also be used to pre-cool the fresh air, when the ventilation unit 30 works to cool the air.

In another alternative configuration, the unit 50 housing the two fans 21, 41 may further include filters 52, and may include humidifying means 53. Both of these means are well known in the art, particularly with respect to central pulsed air systems.

Should a user desire cooling of the air, the central unit 50 may also be provided with air-conditioning means 54. Obviously, if the air-conditioning system is enabled, the heating means will be disabled.

One of the advantages of the invention is that since the control of the heating is effected at each of the ventilation units 30 through individual thermostats which can be located on a wall in the room or integrated into the ventilation unit 30, the conduits 16 which dispatch the fresh air to the various ventilation units 30 can be of small size. This permits easy assembly into an existing structure (i.e. a retrofit), and does not compromise space in a new structure. By small conduits it is understood that the conduits can have a diameter in the order of a few centimeters, preferably between 5 and 10 centimeters, although the size for a complete ventilation system can be modified according to the ventilation needs. The expression small diameter is used to contrast with the large conduits that are used in pulsed air systems.

One of the problems associated with dispatching air through smaller conduits is the noise so produced because of the relatively high velocity of the air. This is due to the fact that previous <<small conduit>> systems included central heating means, resulting in a high volume of air needed to heat a room or a very high temperature of the air. The use of small conduits is an impediment to high volume of air because losses increase dramatically with speed of the air. On the other hand, high temperature air requires additional insulation, which increases the diameter of the conduits and defeats the purpose of having small conduits. This problem is obviated with the present invention, since the air that travels in the small conduits is not heated—it is only fresh air. Consequently, there is no need for insulation or larger conduits.

The problem of noise is attenuated in the present invention by the use of an adequate diffuser. Preferably, the diffuser 35 has an outlet 71 having a width equal to a width of the conduit, as shown in FIG. 2. Furthermore, the diffuser 35 has a generally triangular shape, also shown in FIG. 2. In tests performed to evaluate the efficiency of the system, air was delivered to the diffuser at two different rates, i.e. 5 liters per second and 10 liters per second, which are in the range of values recommended by NBC 95 and are not values which are absolutely required by the invention. At either of these rates, the noise generated by the ventilation system is similar, or lower, than the noise produced by a standard central pulsed air system. Furthermore, since the diffuser 35 has the cross-sectional shape of that shown on FIG. 2, the plume outputted by the ventilation unit is stronger, and further away from the wall, than with that produced by an electric baseboard heater or by a convector unit, thus increasing the efficiency of heating and improving comfort for the occupants.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. A ventilation unit for use with a system for heating and ventilating an enclosed space, said ventilation unit including a conduit defining an air passage having a first and second opposite end, said first opposite end lying proximate a floor, said second opposite end extending in a direction opposite said floor, a heater located inside said conduit proximate said first opposite end, said conduit having a central portion between said two opposite ends that is substantially vertical, said second opposite end lying in a plane substantially perpendicular to said floor, a fresh air diffuser located behind said conduit and having an outlet proximate said second end, said ventilation unit drawing ambient air through said first opposite end due to a chimney effect created by said conduit, due to said heater which heats said ambient air and forces said heated ambient air to rise, and due to said fresh air diffuser which propels said heated air out of said conduit at said second end and at an angle with respect to vertical into said space and entrains said ambient air through said conduit.

2. A ventilation unit according to claim 1, wherein said fresh air diffuser feeds fresh air into said unit at a rate between 5 and 10 liters per second.

3. A ventilation unit according to claim 2, wherein said conduit has a length and a width, said length being greater than said width, and wherein said fresh air diffuser outlet has a width equal to the width of the conduit.

4. A ventilation unit according to claim 3, wherein said fresh air diffuser further includes a small diameter inlet.

5. A method for heating a room, comprising the steps of:

providing a ventilation unit in said room, said ventilation unit including a conduit defining an air passage having a first and second opposite end, said first opposite end lying proximate a floor, said second opposite end extending in a direction opposite said floor, a heater located inside said conduit proximate said first opposite end, said conduit having a central portion between said two opposite ends that is substantially vertical, said second opposite end lying in a plane substantially perpendicular to said floor, a fresh air diffuser located behind said conduit and having an outlet proximate said second end, said ventilation unit drawing ambient air through said first opposite end due to a chimney effect created by said conduit, due to said heater which heats said ambient air and forces said heated ambient air to rise, and due to said fresh air diffuser which propels said heated air out of said conduit at said second end at an angle with respect to vertical and into said space and entrains said ambient air through said conduit; and connecting said diffuser to a fresh air source.

6. A method according to claim 5, further including the step of evacuating vitiated air from said room through an evacuation conduit.

7. A method according to claim 6, further including the step of preheating said fresh air prior to delivering said fresh air to said diffuser.

8. A method according to claim 6, further comprising the step of feeding fresh air through said fresh air source through a small diameter conduit, and with a rate between 5 and 10 liters per second.

* * * * *